Aug. 17, 1954  A. R. COSTARELLA  2,686,324
SCRAPER ATTACHMENT FOR LIFT TRUCKS
Filed Nov. 15, 1951
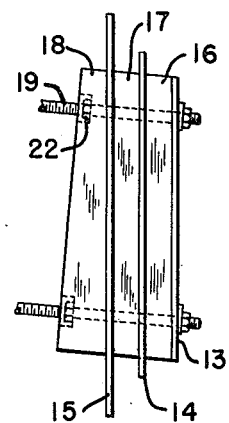
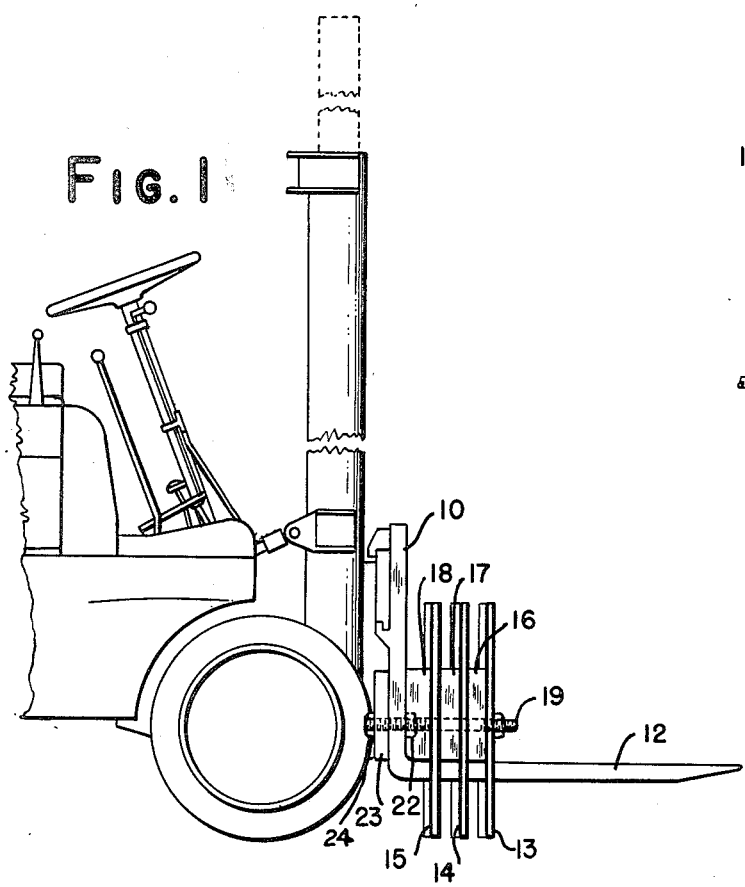
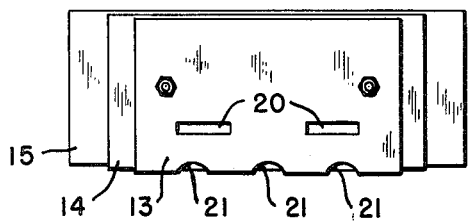
INVENTOR.
ANTHONY R. COSTARELLA
BY
Donald G. Dalton,
his attorney.

Patented Aug. 17, 1954

2,686,324

UNITED STATES PATENT OFFICE 2,686,324

SCRAPER ATTACHMENT FOR LIFT TRUCKS

Anthony R. Costarella, McDonald, Ohio

Application November 15, 1951, Serial No. 256,521

2 Claims. (Cl. 15—93)

This invention relates to a scraper attachment for fork-type lift trucks.

An object of the invention is to provide a scraper attachment which can be installed on a truck fork for cleaning a plant floor or the like.

A further object is to provide a scraper attachment which includes a plurality of spaced apart blades of progressively increasing effective length, whereby the blades can scrape a relatively hard deposit such as caked grease, and the force against the blades is distributed among the different blades.

A further object is to provide a scraper attachment of simple rugged construction which is easily installed on a truck fork or removed therefrom, whereby the truck can be used in lieu of special equipment for cleaning a plant floor or the like.

In accomplishing these and other objects of the invention, I have provided improved details of structure, a preferred form of which is shown in the accompanying drawing, in which:

Figure 1 is a side elevational view of a part of a fork-type lift truck which has installed thereon a scraper attachment constructed in accordance with the present invention;

Figure 2 is a top plan view of the scraper attachment; and

Figure 3 is a front perspective view of the attachment.

Figure 1 shows somewhat schematically part of a fork-type lift truck which can be of any standard or desired construction. The front of the truck carries a fork 10 which can be raised and lowered and is adapted to carry a load, as known in the art. The fork includes a pair of spaced apart, horizontally directed tines 12.

The scraper attachment of the present invention includes a plurality of blades 13, 14, and 15 and spacers 16, 17 and 18 which are assembled on a pair of bolts 19. The blades contain openings 20 for receiving the fork tines 12. The front blade 13 is the shortest and preferably its lower or scraping edge has cut-outs 21 which further reduce its effective length (Figure 3). The middle blade 14 extends outwardly of the front blade at both ends and the back blade 15 similarly extends outwardly of the middle blade. The lower or scraping edges of the three blades are in a common plane (Figure 1). The front and middle spacers 16 and 17 space the three blades from each other, preferably in parallel relation. The back spacer 18 spaces the assemblage from the uprights of the fork 10 and preferably is wedge-shaped in plan so that the blades are oblique to the width of the truck (Figure 2).

The back spacer 18 preferably is recessed to receive nuts 22 which are threadedly engaged with bolts 19 to hold the assemblage together. These bolts preferably extend rearwardly of said nuts for attaching the scraper to the truck fork. When the scraper is thus attached, the bolts extend through openings in the uprights of the fork. A locking member 23 is placed over the nuts and held by nuts 24.

The scraper attachment enables a fork truck to be used effectively for cleaning plant floors or the like of hard deposits, as well as loose material. For example, in steel mill flat rolled finished units and in warehouses such trucks commonly are used for handling the product. In such places an accumulation of grease of rubber-like consistency often builds up on the floors. The scraper attachment can be used very effectively for removing this accumulation. When the scraper is used on hard deposits, the progressively increasing effective length of the blades distributes the load among the different blades and thus minimizes the shock to each blade. The oblique direction of the blades pushes the scrapings to one side where they are easily picked up.

While I have shown and described only a single embodiment of the invention, it is apparent that modifications may arise. Therefore, I do not wish to be limited to the disclosure set forth but only by the scope of the appended claims.

I claim:

1. A scraper attachment comprising front, middle and back blades of progressively increasing effective length from front to back having lower scraping edges in a common plane, spacers between said blades, a spacer of wedge shape in plan back of said back blade, bolts passing through said blades and said spacers and holding them assembled with said blades in spaced parallel relation, said blades having openings adapted to receive a supporting structure, said bolts being adapted to extend through the supporting structure, and means for attaching said bolts to the supporting structure, said wedge shaped spacer being adapted to space the blades from the supporting structure so that they extend in a direction oblique to the latter.

2. A scraper attachment comprising front, middle and back blades of progressively increasing effective length from front to back having lower scraping edges in a common plane, said front blade having cut-outs in its scraping edge, spacers between said blades, a spacer of wedge shape in plan back of said back blade, bolts passing through said blades and said spacers and holding them assembled with said blades in spaced parallel relation, said blades having openings adapted to receive a supporting structure, said bolts being adapted to extend through the supporting structure, and means for attaching said bolts to the supporting structure, said wedge shaped spacer being adapted to space the blades from the supporting structure so that they extend in a direction oblique to the latter.

References Cited in the file of this patent

UNITED STATES PATENTS

| Number | Name | Date |
|---|---|---|
| 130,925 | Little | Aug. 27, 1872 |
| 919,428 | Gillespie | Apr. 27, 1909 |
| 1,347,336 | Karr | July 20, 1920 |
| 2,061,585 | Meyer | Nov. 24, 1936 |
| 2,279,454 | Fischer | Apr. 14, 1942 |
| 2,421,472 | Way | June 3, 1947 |
| 2,482,692 | Quales et al. | Sept. 20, 1949 |